Nov. 15, 1966 J. D. BANATHY ETAL 3,285,513
TIMER ADJUSTED OVEN TEMPERATURE CONTROL
Filed Sept. 21, 1964 6 Sheets-Sheet 5

United States Patent Office 3,285,513
Patented Nov. 15, 1966

3,285,513
TIMER ADJUSTED OVEN TEMPERATURE CONTROL
Jeno D. Banathy, Chicago, and Edward F. Condon, Jr., Oak Park, Ill., assignors to International Register Company, Chicago, Ill., a corporation of Illinois
Filed Sept. 21, 1964, Ser. No. 397,821
12 Claims. (Cl. 236—46)

This invention relates, generally, to electricity circuit makers and breakers and it has particular relation to such devices employed for setting a thermostat that is used for controlling heat, either gas or electric, that is supplied to an oven, such as a domestic baking oven, to maintain the temperature thereof at certain values depending upon the desired conditions. It constitutes an improvement over the inventions disclosed in application Serial No. 243,036, filed December 7, 1962, now Patent No. 3,244,-841, by Alfred W. Gardes and Edward T. Patrick and Serial No. 319,286, filed October 28, 1963 by Jeno D. Banathy, both assigned to the assignee of this application.

In the Gardes and Patrick application above referred to a semi-automatic control system is provided for a thermostat. For its operation the thermostat is manually preset to the desired operating or cooking or baking temperature, such as 325° F. to 350° F. A timer is set to apply heat to the oven then or at a later time. The thermostat functions to maintain the temperature at the preset temperature for a preset cooking or baking interval at the expiration of which the thermostat is driven by a motor to a lower setting or a holding temperature, for example 140° F., where this temperature is held until the thermostat is manually returned to the off position.

The invention disclosed in the Banathy application is capable of automatically controlling the number of cooking or baking hours required as well as the temperature at which these operations are performed. It operates at the beginning of the preset cooking or baking time to advance the thermostat from its off or initial position to the cooking or baking position at which heat is supplied and the temperature of the oven is maintained at 325° F. or 350° F. or some other preadjusted temperature. At a time that is determined by the preset cooking or baking interval, which is the cooking or baking hours, the thermostat is retracted to a holding temperature which may be 140° F. or 150° F. or some other preseleted temperature. This temperature is maintained for a predetermined period, for example two hours, at the termination of which the thermostat is restored to the initial or off position, no additional heat is supplied to the oven, and the timer is returned to the manual position. The system then can be used for manual control or for automatic control of the oven as may be desired.

According to this invention, the cooking or baking hours are preset by suitable manual adjustment of a cooking hours control knob which rotates a cooking hours dial to the desired cooking hours position. This operation completes a circuit for energizing an electric motor which drives a thermostat setting member from an initial or off position to an operating position corresponding to a desired cooking or baking temperature which may be 325° F. or 350° F. or some other preselected temperature. When the motor, herein referred to as the up motor, has driven the thermostat setting member to this position, the motor energizing circuit is opened by a limit switch. The thermostat then acts in conventional manner to control the supply of gas or electrical energy to the oven to maintain it at this preselected temperature. At a preselected time, for example one half hour, before the end of the cooking or baking period that had been previously selected and set by the cooking hours control knob, a continuously operating timer completes a circuit for energizing another electric motor, herein referred to as the down motor, which also is connected to drive the thermostat setting member. It is driven in a reverse direction to a holding position which corresponds to a holding temperature that may be 140° F. or 150° F. or some other preselected holding temperature at which no further cooking or baking normally will occur. When the down motor has driven the thermostat setting member to the holding position, the energizing circuit therefor is opened by a limit switch. This holding temperature is maintained until the thermostat setting member is returned manually to the initial or off position.

Among the objects of this invention are: To provide (1) for driving a thermostat setting member of an adjustable thermostat that is arranged to control heat, either electric or gas, supplied to an oven such as a domestic oven, from an initial or off position to an operating position in which the thermostat maintains a preselected cooking or baking temperature, and (2) near the end of a manually selected cooking or baking period for driving the thermostat setting member in a reverse direction to a holding position where a holding temperature is maintained by the thermostat that serves only to keep the oven warm but is insufficient to cause further cooking or baking, from which position the thermostat setting member can be returned manually to the initial or off position; to employ separate motors, i.e., up and down motors, for driving the thermostat setting member in one direction and in the opposite direction; to energize the motors through separate limit swiches to open energizing circuits to the motors when they have driven the thermostat setting member to the operating and holding positions respectively; to provide for manually moving the thermostat setting member to an operating position and in so doing opening contacts that otherwise complete the energizing circuit to the up motor; to reclose these contacts when the thermostat setting member is rotated from the off or initial position through a predetermined extent by the up motor or is returned to the off or initial position from a position to which it has been moved above this position; to shunt these contacts while the thermostat setting member is being driven by the up motor through a predetermined extent from the initial or off position; to arrange for the up and down motors to drive the thermostat setting member through a gear arranged to have driving connection thereto; to include in this driving connection a lost motion connection which permits the contacts to be opened when the thermostat setting member is moved manually from the initial or off position to an operating position; to provide the limit switches in the form of stationarily mounted arcuate contact segments coaxial with the axis of rotation of the gear for engagement by contact means in the form of pins carried by the gear; to mount the contacts that complete the energizing circuit to the up motor on the gear and to open them by a detent carried by a plate non-rotatably mounted on the thermostat setting member and loosely mounted in a cavity in a gear thereby providing the lost motion connection between the gear and the thermostat setting member; to arrange for the detent to operate an overcenter member to hold the contacts open; and, to provide for operating the overcenter member to a position in which the contacts are closed when the thermostat setting member is manually returned to the initial or off position.

In the drawings.

FIG. 4-A and 4-B, taken together, show in perspective and in spaced relation the thermostat and the parts associated therewith for controlling its operation, the back plate being shown in both portions of these figures in order to more clearly illustrate the arrangement.

Figure 1:
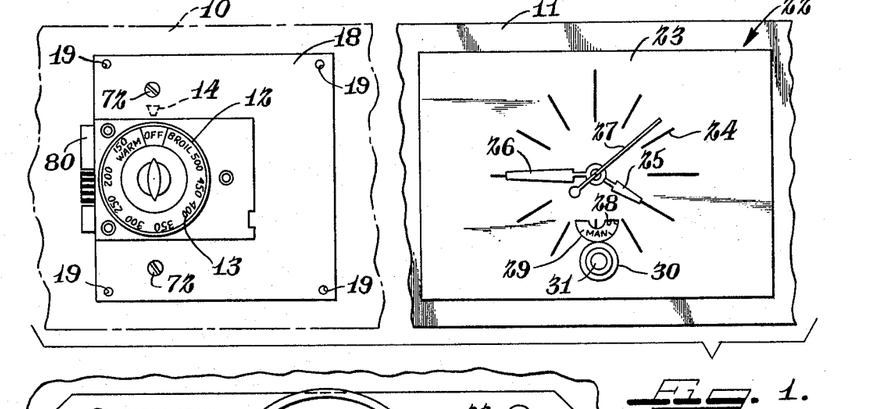
FIG. 1 is a view, in front elevation, of panel sections of a stove or oven on which the control devices of the present invention can be mounted, it being understood that there is no mechanical linkage between the control devices.

Referring now particularly to FIG. 1 of the drawings, it will be observed that the reference characters 10 and 11 are applied to panel sections of a stove or oven. They may comprise a continuous panel or separately located panel sections as may be required. The panel section 10 is shown in broken outline in order to show in elevation certain of the parts mounted immediately to the rear thereof.

Figure 4:
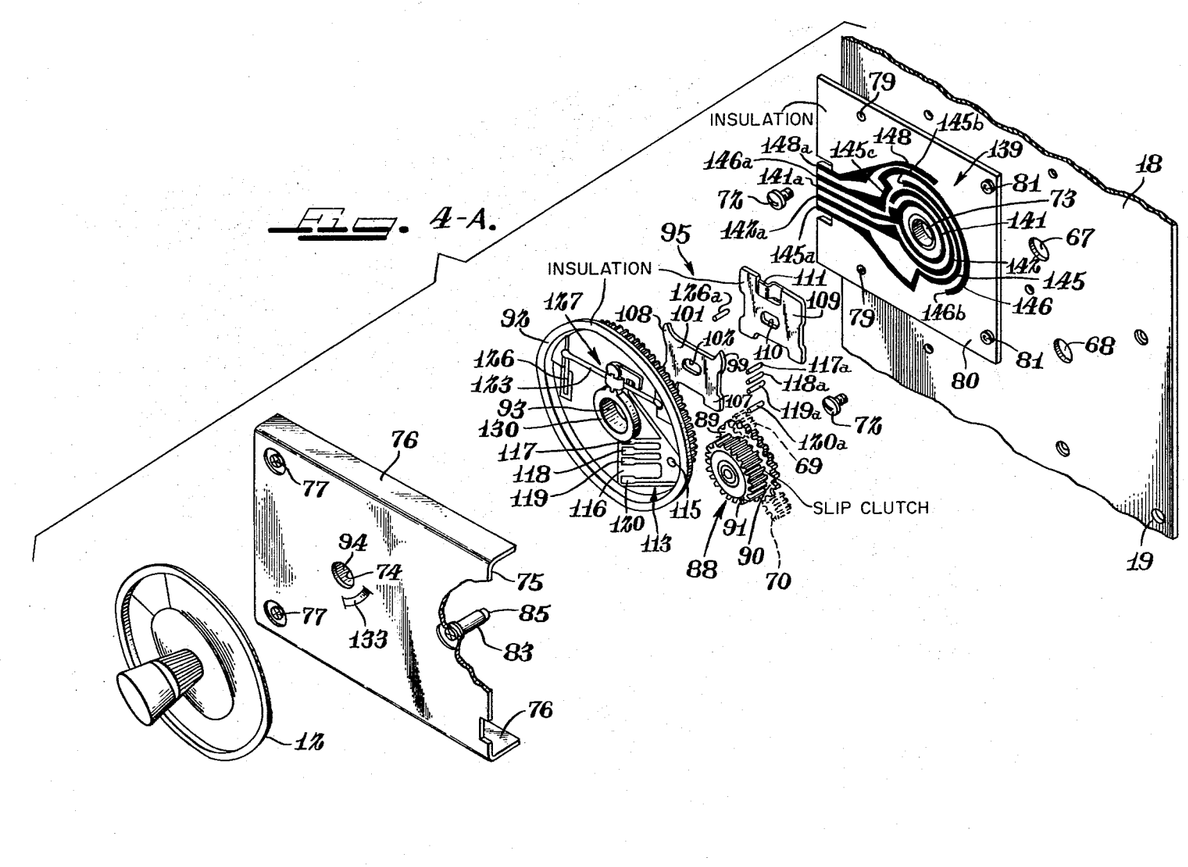

In FIG. 1, there is shown a manually operable thermostat dial 12 which is provided with conventional scale markings 13 for movement relative to an index 14 that is located on the panel section 10. The thermostat dial 12 is arranged to be non-rotatably mounted on a thermostat setting member 15 which is shown in FIG. 4-B as a shaft having a non-circular cross section and arranged to control the positioning of a thermostat, indicated generally at 16; which is of conventional construction and may be arranged to control the flow of gas or electrical energy for heating an oven. A temperature probe 17 is associated with the thermostat 16 and is arranged to be positioned within the oven for controlling the operation of the thermostat 16. The thermostat 16 is arranged to be mounted on the rear of a back plate 18 which is provided with openings 19 for receiving suitable mounting screws to secure it in operative position on the panel section 10.

Again, referring to FIG. 1, it will be observed that the reference character 22 designates, generally, a range timer of conventional construction which includes a dial plate 23. It is arranged for mounting on the panel section 11. Alternatively, the dial plate 23 may constitute a part of the panel section 11. It is provided with a time scale 24 with respect to which an hour hand 25, a minute hand 26 and a second hand 27 are arranged to rotate for time indicating purposes. In the lower part of the dial plate 23 there is provided an arcuate opening 28 through which a portion of an hours to cook dial 29 can be viewed.

The hours to cook dial 29 carries a scale, for example, a scale along its periphery indicating times from one to eight hours which correspond to the usual cooking or baking times that are required. In addition, the hours to cook dial 29 carries an indication "MAN" to indicate that the system is arranged to function under manual control. Below the arcuate opening 28, there is mounted an hours to cook setting knob 30 which is arranged to rotate the hours to cook dial 29 to the desired number of cooking or baking hours. In addition, the hours to cook setting knob 30 is arranged to operate a switch for completing a circuit to energize the up motor as described hereinafter. Coaxially mounted with the hours to cook setting knob 30 is a clock setting knob 31 that is arranged to set the hour hand 25 and minute hand 26 to the correct time.

Figures 2, 3:
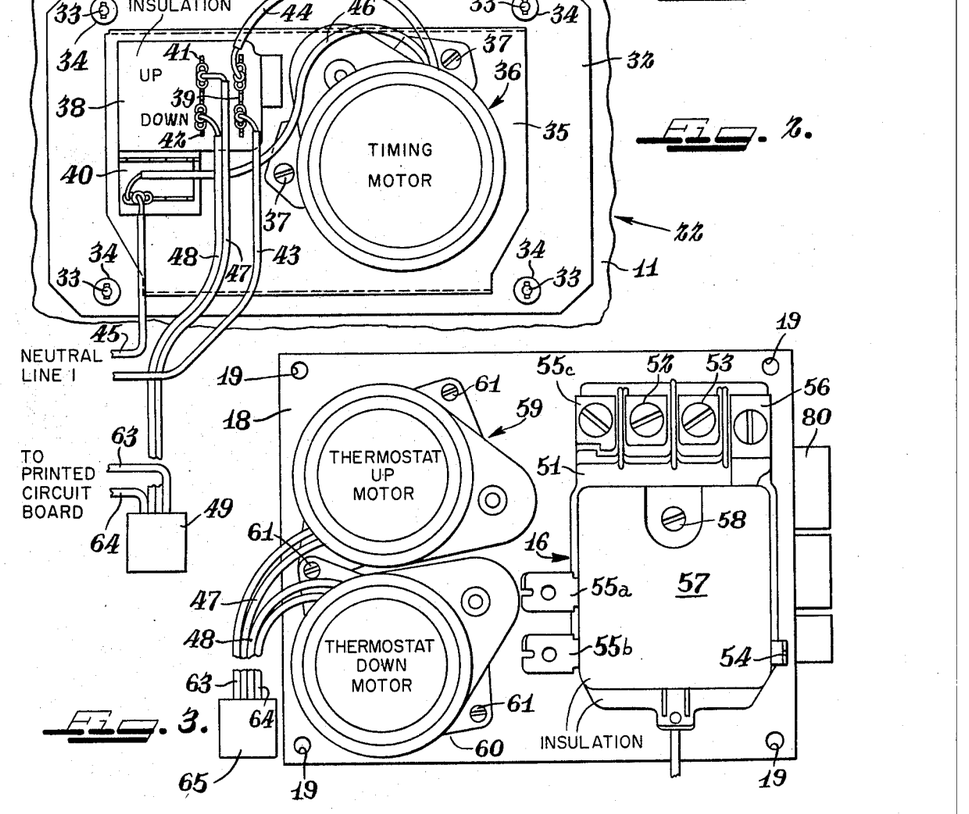
FIG. 2 is a view, in rear elevation, of the range timer shown in FIG. 1.
FIG. 3 is a view, in rear elevation, of the thermostat, the up and down motors therefor, and the back plate on which they are mounted.

FIG. 2 shows a rear view of the range timer 22. Here it will be observed that the range timer 22 includes a front plate 32 that is secured by pins 33 that project rearwardly from the panel section 11. Friction washers 34 serve to hold the front plate 32 securely in position. Other mounting means can be employed. Suitably secured to the front plate 32 is a back mounting plate 35 which carries a synchronous timing motor 36 that is held in position by screws 37. It will be understood that the synchronous timing motor 36 is arranged to drive the hour hand 25, minute hand 26, and second hand 27 for time keeping purposes. Also, suitably mounted on the back mounting plate 35 is a terminal block 38 of insulating material. It carries a line terminal 39 and a neutral terminal 40. Also it carries an up motor terminal 41 and a down motor terminal 42. A line conductor 43 is connected to the line terminal 39 to which a motor conductor 44 is also connected for energizing the timing motor 36. A neutral conductor 45 is connected to the neutral terminal 40 to which a motor neutral conductor 46 is connected for completing the energizing circuit to the timing motor 36 which it will be understood is connected between the line and neutral of a 115 volt alternating current 60 cycle circuit. Up and down motor conductors 47 and 48 are connected, respectively, to the up and down motor terminals 41 and 42 which, as will appear hereinafter, are connected to contacts of the range timer 22, the connections to which are controlled by the timing motor 35 and the hours to cook setting knob 30. The conductors 47 and 48 are connected to a plug 49 to facilitate connection to other conductors of the control system.

FIG. 3 shows a rear view of the thermostat 16 and the parts associated therewith mounted on the rear of the back plate 18. The thermostat 16 includes an insulating housing 51 which carries line terminals 52 and 53 that are arranged to be connected to a 230 volt alternating current 60 cycle source. Connection to the neutral of this source is provided by a neutral terminal 54. Load terminals 55a, 55b and 55c are arranged to be connected to the bake and broil units of the oven that are arranged to heat and maintain the temperature under the control of the thermostat 16 when it is adjusted for this purpose. A switch terminal 56 is also mounted on the insulating housing 51. An insulating cover 57 is secured by a screw 58 to the insulating housing 51 and serves to enclose the switch contacts to which the switch terminal 56 is connected.

Also mounted on the rear of the back plate 18 are a thermostat up motor, indicated generally at 59, and a thermostat down motor, indicated generally at 60. They are secured in position on the back plate 18 by screws 61. It will be observed that the up and down motor conductors 47 and 48 also are shown in FIG. 3 and are arranged, as will appear hereinafter, to be connected to these same numbered conductors shown in FIG. 2 for selectively energizing the up and down motors 59 and 60. In addition, up and down motor conductors 63 and 64 are provided for completing the energizing circuits to the motors 59 and 60. All of these conductors terminate in a terminal plug 65 that is arranged to engage a suitable jack (not shown), for completing the circuits to the plug 49 and to the 60 cycle source.

Figure 13:
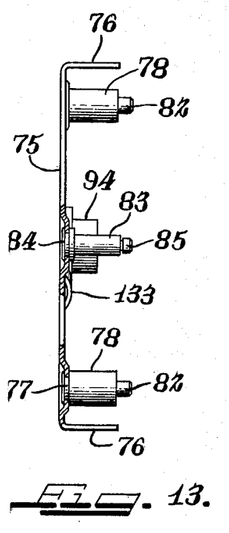
FIG. 13 is a view, partly in end elevation and partly in section, of the front plate shown in FIG. 12.

FIGS. 4–A and 4–B illustrate how the up and down motors 59 and 60 are arranged for driving the thermostat setting member 15 in one direction or the other. Here it will be observed that the back plate 18 is provided with openings 67 and 68 through which pinions 69 and 70 project from the up and down motors 59 and 60. It will be understood that the pinions 69 and 70 are driven through suitable reduction gear trains since the up and down motors 59 and 60 operate at relatively high speeds. The thermostat 16 is provided with mounting foot portions 71 which are arranged to bear against the rear side of the back plate 18 and to be secured thereto by screws 72 that project therethrough. The back plate 18 also is provided with an opening 73 through which the thermostat setting member 15 projects. Also it projects through an opening 74 in the front plate 75 that is provided with rearwardly turned flanges 76. The front plate 75 is secured in position on the back plate 18 by pins 77 which, as is shown more clearly in FIG. 13, include integral spacer portions 78 to space accurately the front plate 75 from the back plate 18. The rear ends of the pins 77 extend through openings 79 in a printed circuit board 80 of insulating material and thereby serve to secure it in position on the back plate 18. In addition, hollow rivets 81 also extend through the printed circuit board 80 and the back plate 18 to hold the former in position thereon. The rear ends 82 of the pins 77 are headed over to secure them in position. The front plate 75 also is held in position on the back plate 18 by a shaft 83. One end 84 of the shaft 83 extends through the front plate 75 and is headed over. The other end 85 of the shaft 83 projects through the back plate 18 and is headed over.

Freely rotatably mounted on the shaft 83 between the back plate 18 and the rear side of the front plate 75 is a gear and clutch assembly that is indicated, generally, at 88. It includes a gear 89 which is in driving engagement with both of the pinions 69 and 70. A slip clutch 90, indicated by the legend, is interposed between the gear 89 and a gear 91 and is arranged to transmit the driving torque of the gear 89 to the gear 91 while permitting the latter to rotate relative to the gear 89 in either direction on a manual rotation of the thermostat setting member 15 without rotating the gear 89 and thereby requiring rotation of the pinions 69 and 70 and their associated gear trains and rotors of the motors 59 and 60.

Figure 12:
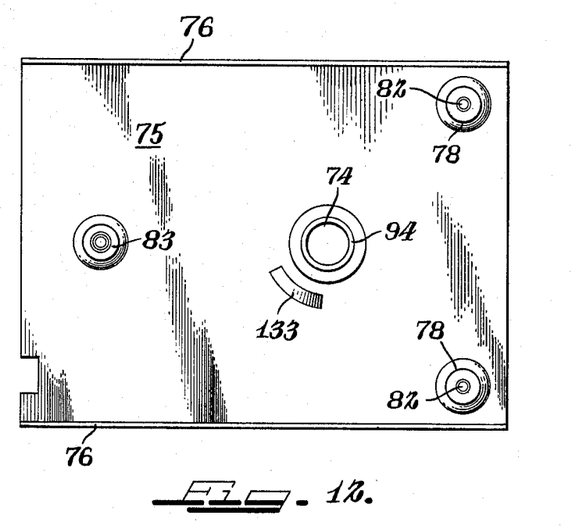
FIG. 12 is a view, in rear elevation, of the front plate on which the gear is rotatably mounted.

The gear 91 is arranged to drive a gear 92 that is formed of insulating material. It has a central opening 93 through which the thermostat setting member 15 extends. The gear 92 is journaled on a bearing sleeve 94, FIGS. 12 and 13, that is suitably secured to the rear side of the front plate 75.

Figures 8, 9:
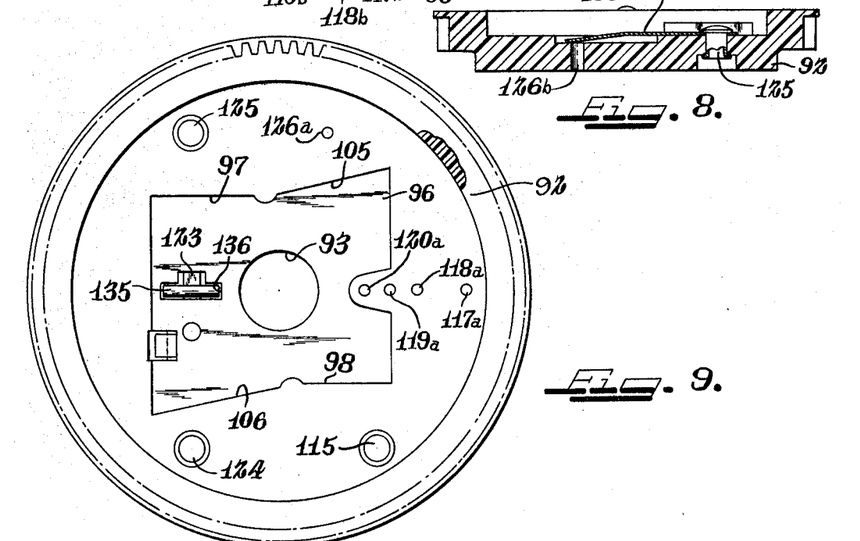
FIG. 8 is a horizontal sectional view taken generally along the line 8—8 of FIG. 5.
FIG. 9 is a view, in rear elevation, of the gear shown in FIG. 5.

The gear 92 has a lost motion driving connection, indicated generally at 95, to the thermostat setting member 15. The arrangement and construction of the lost motion connection 95 are illustrated more clearly in FIGS. 9, 10 and 11. Here it will be observed that the gear 92 is provided on its rear side with a cavity 96 having upper and lower side portions 97 and 98 that are arranged, FIG. 10 to be engaged by arms 99 and 100, respectively, of a metallic plate 101 which has a non-circular central opening 102, FIG. 4–A, to receive the thermostat setting member 15 so that the metallic plate 101 is non-rotatably mounted thereon. When the gear 92, FIG. 10, is rotated in the direction indicated by the arrow 103 by the up motor 59, the arms 99 and 100 engage the sides 97 and 98 of the cavity 96 and thereby effect rotation of the thermostat setting member 15 in the same direction.

Figures 10, 11:
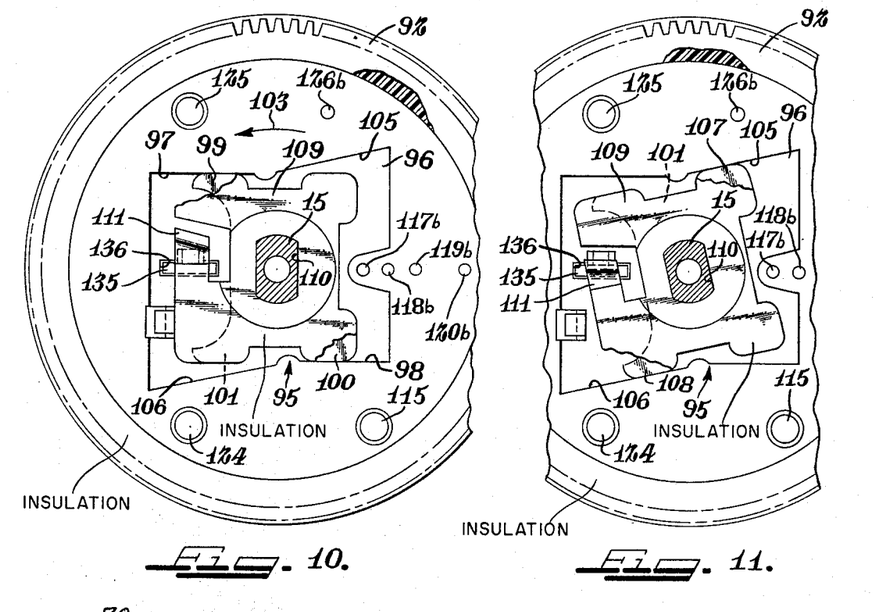
FIG. 10 is a view, in rear elevation, of the gear and shows how the lost motion has been taken up in the lost motion connection when the gear drives the thermostat setting member.
FIG. 11 is a view, similar to FIG. 10, that shows how the lost connection permits a limited degree of relative rotation of the thermostat setting member with respect to the gear in order to provide a certain control function when the thermostat setting member is rotated manually.

When the thermostat setting member 15 is rotated manually in the direction indicated by the arrow 103, the metallic plate 101 is rotated, as indicated in FIG. 11, through a limited extent, for example 12°, relative to the gear 92 until the other upper and lower side portions 105 and 106 of the cavity 96 are engaged by arms 107 and 108, respectively, of the metallic plate 101. Thereafter, continued rotation manually of the thermostat setting member 15 effects conjoint rotation of the gear 92. Overlying the metallic plate 101 is a plate 109 of insulating material which has the same general dimensions as the metallic plate 101 and is provided with a non-circular opening 110 for non-rotatable mounting on the thermostat setting member 15. The plate 109 of insulating material is provided with an integral flexible detent 111 for opening contacts to be described when the plates 101 and 109 are rotated from their position as shown in FIG. 10 to their position as shown in FIG. 11. It will be understood that the metallic plate 101 is provided for insuring that there is a driving connection between the thermostat setting member 15 and the gear 92. Thus, it reinforces the plate 109 of insulating material which might be adversely affected by high temperature and thus incapable of transmitting torque between the thermostat setting member 15 and the gear 92. However, it will be understood that the metallic plate 101 can be omitted and the plate 109 of insulating material made of appropriate thickness where it is considered that such a construction would provide a satisfactory mechanical connection between the thermostat setting member 15 and the gear 92 with the lost motion provided as described.

Figures 5, 6:
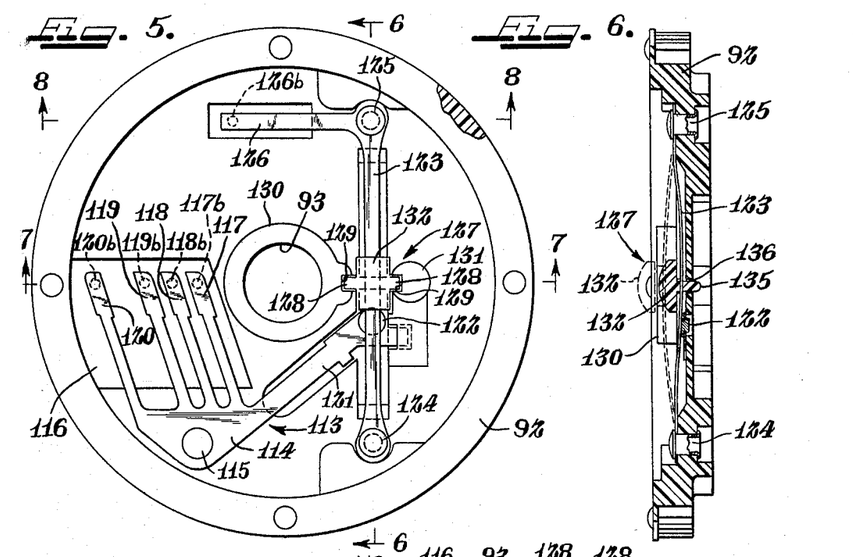
FIG. 5 is a view, in front elevation, of the gear that has a lost motion driving connection to the thermostat setting member and illustrates how the contact finger assembly and associated parts are mounted thereon.
FIG. 6 is a vertical sectional view taken generally along the line 6—6 of FIG. 5.

Referring now to FIG. 5, it will be observed that a contact finger assembly, shown generally at 113, is mounted on the front side of the gear 92 and rotates therewith. The contact finger assembly 113 includes a base section 114 that is secured by a rivet 115 to the body of the gear 92. The contact finger assembly 113 is mounted partly in a cavity 116 in the front side of the gear 92. Extending from the base section 114 and into the cavity 116 are spring contact fingers 117, 118, 119 and 120. Associated with each of these spring contact fingers, as shown in FIG. 4–A, are contact pins 117a, 118a, 119a and 120a that extend respectively through openings 117b, 118b, 119b and 120b in the gear 92. These contact pins rotate together with the gear 92 and are arranged to make contact with segments of printed circuit elements located on the printed circuit board 80, which will be described presently.

Figure 7:
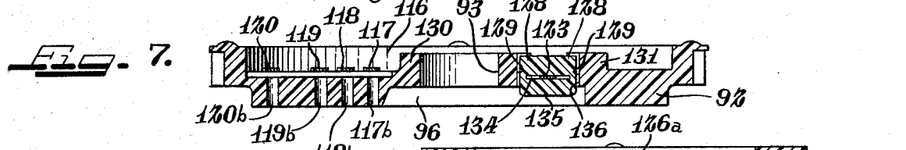
FIG. 7 is a horizontal sectional view taken generally along the line 7—7 of FIG. 5.

As shown in FIG. 5, an arm 121 is formed integral with and extends from the base section 114 of the contact finger assembly 113. The arm 121 carries a contact button 122 that is arranged to be engaged by an overcenter contact spring 123 that also is shown in FIGS. 6 and 7. The ends of the overcenter contact spring 123 are secured by rivets 124 and 125 to the gear 92 in such manner that it either occupies the position shown by full lines in FIG. 6, or by the position shown by broken lines. In the former, it is in contact engagement with the contact button 122, and in the latter it is out of engagement therewith. The circuit extends from the overcenter contact spring 123 through an integral arm 126 or spring contact finger which has a contact pin 126a, FIG. 4–A, associated therewith and extending through an opening 126b, FIG. 8, in the gear 92.

For moving the overcenter contact spring 123 from one position to the other, a T-shaped insulating operator 127 is provided. The ends 128 of the cross-bar of the T-shaped operator 127 are guided in slots 129 that are formed in an annular molded part 130 of the gear 92 and in a boss 131 molded integrally with gear 92. The operator 127 has a curved transverse surface 132 for engagement by an up struck cam 133, FIGS. 12 and 13, that extends rearwardly from the front plate 75. The overcenter contact spring 123 extends through a slot 134, FIGS. 6 and 7, in the stem 135 of the T-shaped insulating operator 127. The stem 135 extends through an opening 136 in the gear 92 and projects into the cavity 96 on the rear side thereof to be engaged by the flexible detent 111 on the plate 109 of insulating material when the thermostat setting member 15 is rotated manually by the thermostat dial 12 relative to the gear 92 as permitted by the lost motion connection 95 therebetween. When such action takes place, the T-shaped insulating operator 127 is moved with a snap action from the full line position shown in FIG. 6 to the alternate position shown by broken lines together with the overcenter contact spring 123 which then opens the circuit that previously had been completed through the contact button 122 to the spring contact finger 126 and contact pin 126a.

Referring now to FIGS. 4-A and 14 of the drawings, it will be observed that the printed circuit board 80 carries printed circuits indicated generally at 139. The contact pins 117a, 118a, 119a, 120a and 126a, mounted on and rotatable with the gear 92, occupy the positions shown by full lines in FIG. 14 when the thermostat setting member 15 and thermostat dial 12 are in the off position. When the thermostat setting member 15 is rotated in the direction indicated by arrow 140, a corresponding movement of these contact pins takes place. The contact pin 117a always maintains contact engagement with an annular contact segment 141 which has an integral connecting section 141a for connection to the neutral conductor 45. An enlarged contact section 141b inter-connects the annular contact segment 141 and its connecting section 141a and contact pin 118a in the off position engages it. When the thermostat setting member 15 is rotated in the direction indicated by the arrow 140, the contact pin 118a moves off of the enlarged contact section 141b and shortly thereafter engages an almost complete annular contact segment 142 that is connected by its connecting section 142a to energize a pilot light 143. The circuit is completed from the line conductor 43 through the pilot light 143, connecting section 142a, contact segment 142, contact pin 118a, contact finger 118, base section 114, contact finger 117, contact pin 117a, contact segment 141, connecting section 141a to the neutral conductor 45. The pilot light 143 remains lighted until the thermostat setting member 15 is returned to the off position.

Figure 14:
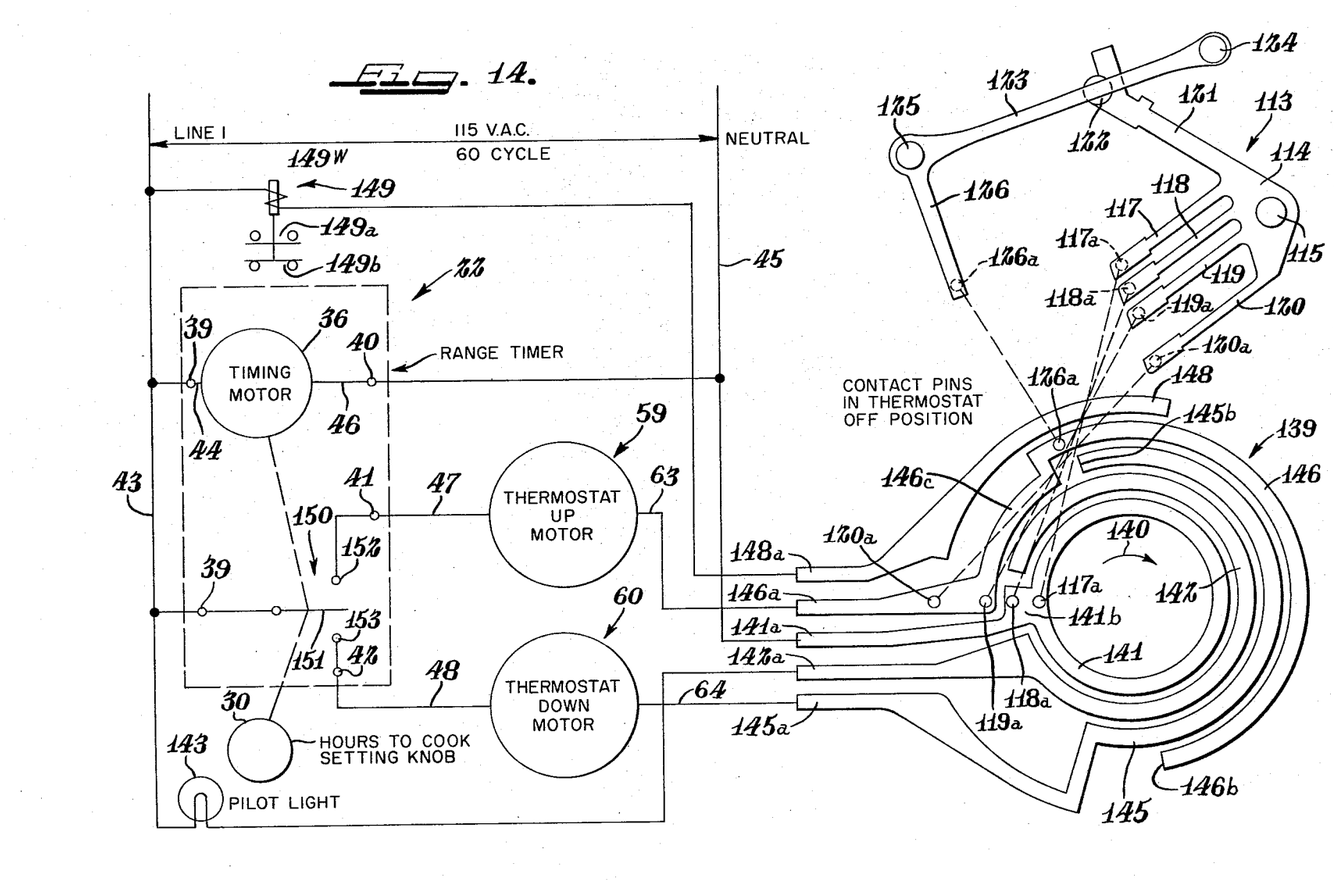
FIG. 14 illustrates diagrammatically the circuit connections that are employed in practicing the present invention.

Partially surrounding the contact segment 142 is an arcuate contact segment 145 which is provided with a connecting section 145a to the conductor 64 which is connected to one side of the down motor 60. An end 145b of the contact segment 145 is arranged to be engaged by the contact pin 119a when the thermostat setting member 15 has been rotated through about 60° from the off position.

During the initial rotation of the contact pin 119a from the off position, it engages an offset arcuate section 146c of an arcuate contact segment 146 which lies outwardly of the contact segment 145. The contact segment 146 has a connecting segment 146a to which the conductor 63 is connected and which connects it to one side of the up motor 59. The circuit to the up motor 59 is maintained either by contact pin 119a or contact pin 126a until the latter runs off of end 146b of the contact segment 146.

Optionally, another arcuate contact segment 148 is provided outwardly of the contact segment 146. It has a connecting section 148a that is arranged for connection to an energizing winding 149w of a relay 149 the other side of which is connected to line conductor 43. The relay 149 is provided with normally open contacts 149a and normally closed contacts 149b that can be employed for any desired control purpose. The relay 149 is energized while contact pin 120a maintains contact engagement with arcuate contact segment 148 with corresponding operation of the contacts 149a and 149b.

As shown in FIG. 14, the range timer 22 includes a range timer switch 150 which is provided with a movable contact 151 that is connected to the line terminal 39 and thereby to line conductor 43. The movable contact 151 is under the control of the timing motor 36 and the hours to cook setting knob 30 as indicated diagrammatically. The hours to cook setting knob 30 is arranged to move the contact 151 into engagement with a stationary contact 151 at the beginning of the cooking or baking period. This completes a circuit from line conductor 43 for energizing the up motor 59. The contact 151 remains in engagement with the stationary contact 152 until the hours to cook dial 29 is rotated by the timing motor 36 to a position somewhat in advance of its position as seen in FIG. 1. At this time, the contact 151 is moved out of engagement with stationary contact 152 and into engagement with a stationary contact 153 of the range timer switch 150. This completes an energizing circuit for the down motor 60 from the line conductor 43 which is maintained for a predetermined period, for example 15 minutes, after which the contact 151 is moved by the timing motor 36 to the intermediate position as shown in FIG. 14. This time period is sufficient to permit the down motor 60 to perform its function of rotating the thermostat setting member 15 from the operating position to which it was set by the up motor 59 to the holding position where it remains until it is manually rotated to the off position by suitable manual rotation of the thermostat dial 12. The return of the movable contact 151 to the intermediate position is accompanied by return movement of the hours to cook dial 29 to the manual position shown in FIG. 1.

FULL AUTOMATIC OPERATION

In describing the operation of the system herein disclosed, it will be assumed that the line conductors 43 and 45 are connected, respectively, to the line and neutral of a 115–230 volt alternating current 60 cycle source; that the terminals of the thermostat 16, as shown in FIG. 3, are connected to this circuit for energizing the heating elements of the oven in conventional manner; that the thermostat dial 12 and the thermostat setting member 15 are in the initial or off position; and that the hours to cook dial 29 is in the manual position, as shown in FIG. 1.

The hours to cook setting knob 30 is rotated manually to rotate the hours to cook dial 29 to the number of hours required for performing the cooking or baking operation. No further manual operation is required until the thermostat dial 12 and thermostat setting member 15 are returned manually from the holding position at an indeterminate time after the expiration of the cooking or baking period to the initial or off position.

The adjustment of the hours to cook setting knob 30 to the desired position shifts the movable contact 151 into engagement with the stationary contact 152 of the range timer switch 150. This completes an energizing circuit for the up motor 59 that can be traced from conductor 43 through movable contact 151, stationary contact 152, conductor 47, up motor 59, conductor 63, connecting section 146a, contact pin 119a, contact finger 119, base section 114, contact finger 117, contact pin 117a, contact segment 141, connecting section 141a to the neutral conductor 45. The up motor 59 drives the gear 92 through the lost motion connection 95 and rotates the thermostat setting member 15 together with the thermostat dial 12 in the direction indicated by arrow 140 in FIG. 14.

Shortly after the thermostat setting member 15 is moved from the initial or off position, the contact finger 118a engages the contact segment 142 and completes the previously traced circuit for energizing the pilot light 143. It remains lighted to indicate that the thermostat setting member 15 is in a position other than the off position.

The up motor 59 continues to drive the thermostat setting member 15, not only through the circuit previously traced but also through a circuit that extends from contact pin 126a, contact finger 126, overcenter contact spring 123, arm 121, base section 114 to the contact finger 117. In effect, the circuit completed through the contact pin 119a and offset arcuate section 146c of the contact segment 146 is in shunt with the circuit that is normally closed by engagement of the contact button 122 with the overcenter contact spring 123. The purpose of this arrangement is to take care of the possibility that the thermostat dial 12 and thermostat setting member 15 might have been rotated inadvertently from the off position a slight extent and sufficient to take up the lost motion connection 95. When this action takes place, the circuit between the contact button 122 and overcenter contact spring 123 is opened. However, for the interval that the contact pin 119 remains in engagement with the offset arcuate section 146c, the circuit is completed for the up motor 59 and it continues to drive the thermostat setting member toward the operating position. Prior to the time that the contact pin 119a leaves contact engagement with the arcuate section 146c, for example after the thermostat setting member 15 has been rotated from the off position through about 50°, the T-shaped insulating operator 127 through its curved transverse surface 132 engages the upstruck cam 133 that is provided on the rear side of the front plate 75. This engagement moves the T-shaped insulating operator 127 from the broken line position shown in FIG. 6 to the full line position where the circuit is completed between the contact button 122 and the overcenter contact spring 123. Now, when the contact pin 119a moves out of engagement with the arcuate contact section 146c, the circuit is maintained for the up motor 59 through the contact pin 126a which remains in engagement with the arcuate contact segment 146 until the thermostat setting member 15 is rotated to the predetermined operating position that corresponds to the pre-set operating temperature which is to be maintained by the thermostat 16. This may be of the order of 325° F. or 350° F. or some other preselected temperature. The up motor 59 is deenergized when the thermostat setting member 15 has reached the preselected position by the contact pin 126a moving beyond the end 146b of the arcuate contact segment 146. The contact pin 126a and the contact segment 146 thus constitute a limit switch which determines when the up motor 59 will be deenergized.

At the beginning of some predetermined period of anticipation, for example one-half hour, before the end of the cooking or baking period previously set by the hours to cook setting knob 30 and reflected by the position of the hours to cook dial 29, the timing motor 36 shifts the contact 151 into engagement with stationary contact 153. The down motor 60 then is energized by a circuit that can be traced from conductor 43, movable contact 151, stationary contact 153, conductor 48, down motor 60, conductor 64, connecting section 145a, arcuate contact segment 145, contact pin 119a, which previously had been moved off of the arcuate contact section 146b and into engagement with the contact segment 145, contact finger 119, base section 114, contact finger 117, contact pin 117a, contact segment 141, connecting segment 141a to the neutral conductor 45.

The down motor 60 then drives the gear 92 after taking up the lost motion provided by the lost motion connection 95 in a reverse direction from that indicated by the arrow 140. This reverse movement of the thermostat setting member 15 continues until the contact pin 119a moves off of the end 145b of the contact segment 145. Thereupon, the down motor 60 is deenergized. This position of the thermostat setting member 15 corresponds to a holding temperature of the order of 140° F. to 150° F. which is maintained by the thermostat 16. This temperature in the holding position of the thermostat setting member 15, while sufficient to maintain the contents of the oven warm, is intended to be insufficient to cause any continued cooking or baking.

The thermostat setting member 15 and thermostat dial 12 remain in the holding position until they are returned manually to the initial or off position. When this occurs, the contact pin 118a moves out of engagement with the contact segment 142 and the circuit to the pilot light 143 is opened and it is extinguished.

Sometime after the contact pin 119a moves out of engagement with the end 145b of the arcuate contact segment 145, which time is selected to make certain that the down motor 60 has moved the thermostat setting member from the operating position to the holding position, the timing motor 36 moves the contact 151 out of engagement with the stationary contact 153 and to the intermediate position shown in FIG. 14.

SEMI-AUTOMATIC OPERATION

In some instances, it is desirable to set the thermostat 16 to maintain a temperature other than the temperature that is maintained when it is automatically set to the pre-determined operating temperature by the up motor 59. For this purpose, the thermostat dial 12 and the thermostat setting member 15 are rotated manually to the desired operating position which may be somewhat above or below the pre-set position to which they are automatically moved by the up motor 59 in the manner described. It is assumed that the desired operation temperature is above the holding temperature and requires a rotation of the thermostat setting member 15 through an extent sufficient to move the contact pin 119a out of engagement with the arcuate contact section 146c. This movement initially is accompanied by taking up the lost motion of the lost motion connection 95 and movement of the overcenter contact spring 123 out of engagement with the contact button 122. The overcenter contact spring 123 is returned momentarily into contact engagement with the contact button 122 when the T-shaped insulating operator 127 moves past the up struck cam 133. However, since the thermostat setting member 15 is being rotated manually, the overcenter contact spring 123 is again moved out of engagement with the contact button 122. This opens the energizing circuit to the up motor 59 which previously had been closed when the hours to cook setting knob 30 was pre-set to the desired number of cooking or baking hours prior to the manual rotation of the thermostat dial 12 and thermostat setting member 15 for maintaining a temperature other than the temperature maintained by the thermostat 16 when it is rotated automatically to the pre-set operating position.

The manually set temperature is maintained during the pre-selected cooking or baking period as determined by the setting of the hours to cook setting knob 30. Near the end of this period, the down motor 60 is energized in the maner previously described to return the thermostat setting member 15 and the thermostat dial 12 to the holding position where they remain until they are reset manually to the initial or off position.

MANUAL OPERATION

For manual operation, the hours to cook setting knob 30 is not moved from the off position. Accordingly, the range timer switch 150 remains in the off position shown in FIG. 14 and circuits are not completed for either the up motor 59 or the down motor 60. The thermostat dial 12 and thermostat setting member 15 are rotated to any position corresponding to a temperature that it is desired to maintain in the oven by the thermostat 16. This condition exists as long as the thermostat dial 12 and the thermostat setting member 15 remain in the manually set position. The temperature at which the oven is maintained can be increased or decreased, as desired, depending upon subsequent adjustment manually of the thermostat dial 12 and the thermostat setting member 15.

What is claimed as new is:

1. In a system for controlling the temperature of an oven, such as a domestic oven, having an adjustable thermostat responsive to the oven temperature to control the heat supplied thereto for maintaining said temperature at a preset value, and a thermostat setting member movable from an initial position to an operating position in which heat is supplied to said oven to maintain a cooking temperature corresponding to said operating position and movable to a holding position in which heat is supplied to said oven to maintain a holding temperature that is substantially less than said cooking temperature, means for moving said thermostat setting member comprising: an up motor adapted to drive said thermostat setting member from said initial position to said operating position, a down motor adapted to drive said thermostat setting member from said operating position to said holding position, timing mechanism including manually settable cooking hours means, means operated by setting of said cooking hours means for closing a circuit to energize said up motor to drive said thermostat setting member as aforesaid, and means operated by said cooking hours means at a time determined by the cooking period for which said cooking hours means is set for closing a circuit to energize said down motor to drive said thermostat setting member as aforesaid.

2. In a system for controlling the temperature of an oven, such as a domestic oven, having an adjustable thermostat responsive to the oven temperature to control heat supplied thereto for maintaining said temperature at a preset value, and a thermostat setting member movable from an initial position to an operating position in which heat is supplied to said oven to maintain a cooking temperature corresponding to said operating position and movable to a holding position in which heat is supplied to said oven to maintain a holding temperature that is substantially less than said cooking temperature, means for moving said thermostat setting member comprising: an up motor adapted to drive said thermostat setting member from said initial position to said operating position, a down motor adapted to drive said thermostat setting member from said operating position to said holding position, timing mechanism including manually settable cooking hours means, means operated by setting of said cooking hours means for closing a circuit to energize said up motor to drive said thermostat setting member as aforesaid, limit switch means completing the energizing circuit for said up motor and opened in response to movement of said thermostat setting member to said operating position for deenergizing said up motor, and means operated by said cooking hours means at a time determined by the cooking period for which said cooking hours means is set for closing a circuit to energize said down motor to drive said thermostat setting member as aforesaid.

3. In a system for controlling the temperature of an oven, such as a domestic oven, having an adjustable thermostat responsive to the oven temperature to control heat supplied thereto for maintaining said temperature at a preset value, and a thermostat setting member movable from an initial position to an operating position in which heat is supplied to said oven to maintain a cooking temperature corresponding to said operating position and movable to a holding position in which heat is supplied to said oven to maintain a holding temperature that is substantially less than said cooking temperature, means for moving said thermostat setting member comprising: An up motor adapted to drive said thermostat setting member from said initial position to said operating position, a down motor adapted to drive said thermostat setting member from said operating position to said holding position, timing mechanism including manually settable cooking hours means, means operated by setting of said cooking hours means for closing a circuit to energize said up motor to drive said thermostat setting member as aforesaid, means operated by said cooking hours means at a time determined by the cooking period for which said cooking hours means is set for for closing a circuit to energize said down motor to drive said thermostat setting member as aforesaid, and limit switch means completing the energizing circuit for said down motor and opened in response to movement of said thermostat setting member to said holding position for deenergizing said down motor.

4. In a system for controlling the temperature of an oven, such as a domestic oven, having an adjustable thermostat responsive to the oven temperature to control heat supplied thereto for maintaining said temperature at a preset value, and a thermostat setting member movable from an initial position to an operating position in which heat is supplied to said oven to maintain a cooking temperature corresponding to said operating position and movable to a holding position in which heat is supplied to said oven to maintain a holding temperature that is substantially less than said cooking temperature, means for moving said thermostat setting member comprising: a manually settable dial adapted to be connected to said thermostat setting member for moving it to a manual operating position, an up motor adapted to drive said thermostat setting member from said initial position to said operating position, lost motion connecting means for connecting said up motor to said thermostat setting member, normally closed contact means for completing an energizing circuit for said up motor and opened in response to movement of said manually settable dial as permitted by said lost motion connecting means, a down motor adapted to drive said thermostat setting member from an operating position to said holding position, timing mechanism including manually settable cooking hours means, means operated by setting of said cooking hours means for closing said circuit to energize said up motor to drive said thermostat setting member as aforesaid, and means operated by said cooking hours means at a time determined by the cooking period for which said cooking hours means is set for closing a circuit to energize said down motor to drive said thermostat setting member as aforesaid.

5. In a system for controlling the temperature of an oven, such as a domestic oven, having an adjustable thermostat responsive to the oven temperature to control heat supplied thereto for maintaining said temperature at a preset value, and a thermostat setting member movable from an initial position to an operating position in which heat is supplied to said oven to maintain a cooking temperature corresponding to said operating position and movable to a holding position in which heat is supplied to said oven to maintain a holding temperature that is substantially less than said cooking temperature, means for moving said thermostat setting member comprising: a manually settable dial adapted to a connected to said thermostat setting member for moving it to a manual operating position, an up motor adapted to drive said thermostat setting member from said initial position to said operating position, lost motion connecting means for connecting said up motor to said thermostat setting member, normally closed contact means for completing an energizing circuit for said up motor and opened in response to movement of said manually settable dial as permitted by said lost motion connecting means, a down motor adapted to drive said thermostat setting member from an operating position to said holding position, timing mechanism including manually settable cooking hours means, means operated by setting of said cooking hours means for closing said circuit to energize said up motor to drive said thermostat setting member as aforesaid, means operated by said cooking hours means at a time determined by the cooking period for which said cooking hours means is set for closing a circuit to energize said down motor to drive said thermostat setting member as aforesaid, and means for reclosing said contacts on return of said thermostat setting member to said initial position.

6. In a system for controlling the temperature of an oven, such as a domestic oven, having an adjustable thermostat responsive to the oven temperature to control heat supplied thereto for maintaining said temperature at a preset value, and a thermostat setting member movable from an initial position to an operating position in which heat is supplied to said oven to maintain a cooking temperature corresponding to said operating position and movable to a holding position in which heat is supplied to said oven to maintain a holding temperature that is substantially less than said cooking temperature, means for moving said thermostat setting member comprising: a manually settable dial adapted to be connected to said thermostat setting member for moving it to a manual operating position, an up motor adapted to drive said thermostat setting member from said initial position to said operating position, lost motion connecting means for connecting said up motor to said thermostat setting member, normally closed contact means for completing an energizing circuit for said up motor and opened in response to movement of said manually settable dial as permitted by said lost motion connecting means, a down motor adapted to drive said thermostat setting member from an operating position to said holding position, timing mechanism including manually settable cooking hours means, means operated by setting of said cooking hours means for closing said circuit to energize said up motor to drive said thermostat setting member as aforesaid, means operated by said cooking hours means at a time determined by the cooking period for which said cooking hours means is set for closing a circuit to energize said down motor to drive said thermostat setting member as aforesaid, means for reclosing said contacts on return of said thermostat setting member to said initial position, and circuit means shunting said contacts while said thermostat setting member is being moved through a predetermined extent from said initial position.

7. In a system for controlling the temperature of an oven, such as a domestic oven, having an adjustable thermostat responsive to the oven temperature to control heat supplied thereto for maintaining said temperature at a preset value, and a thermostat setting member movable from an initial position to an operating position in which heat is supplied to said oven to maintain a cooking temperature corresponding to said operating position and movable to a holding position in which heat is supplied to said oven to maintain a holding temperature that is substantially less than said cooking temperature, means for moving said thermostat setting member comprising: a gear adapted to have a driving connection to said thermostat setting member, an up motor connected to said gear for driving said thermostat setting member from said initial position to said operating position, a down motor connected to said gear for driving said thermostat setting member from said operating position to said holding position, timing mechanism including manually settable cooking hours means, means operated by setting of said cooking hours means for closing a circuit to energize said up motor to drive said thermostat setting member as aforesaid, and means operated by said cooking hours means at a time determined by the cooking period for which said cooking hours means is set for closing a circuit to energize said down motor to drive said thermostat setting member as aforesaid.

8. In a system for controlling the temperature of an oven, such as a domestic oven, having an adjustable thermostat responsive to the oven temperature to control heat supplied thereto for maintaining said temperature at a preset value, and a thermostat setting member movable from an initial position to an operating position in which heat is supplied to said oven to maintain a cooking temperature corresponding to said operating position and movable to a holding position in which heat is supplied to said oven to maintain a holding temperature that is substantially less than said cooking temperature, means for moving said thermostat setting member comprising: a gear adapted to have driving connection to said thermostat setting member, motor means connected to said gear for driving said thermostat setting member from said initial position to said operating position and from said operating position to said holding position, timing mechanism including manually settable cooking hours means, means operated by setting of said cooking hours means for closing a circuit to energize said motor means to drive said thermostat setting member from said initial position to said operating position, means operated by said cooking hours means at a time determined by the cooking period for which said cooking hours means is set for closing a circuit to energize said motor means to drive said thermostat setting member from said operating position to said holding position, limit switch contact segment means stationarily mounted adjacent said gear, and contact means carried by said gear for engaging said limit switch contact segment means to complete the energizing circuit for said motor means to drive said thermostat setting member from said initial position to said operating position and for opening the same in response to movement of said thermostat setting member to said operating position and for completing the energizing circuit for said motor means to drive said thermostat setting member from said operating position to said holding position and for opening the same in response to movement of said thermostat setting member to said holding position.

9. In a system for controlling the temperature of an oven, such as a domestic oven, having an adjustable thermostat responsive to the oven temperature to control heat supplied thereto for maintaining said temperature at a preset value, and a thermostat setting member movable from an initial position to an operating position in which heat is supplied to said oven to maintain a cooking temperature corresponding to said operation position and movable to a holding position in which heat is supplied to said oven to maintain a holding temperature that is substantially less than said cooking temperature, means for moving said thermostat setting member comprising: a manually settable dial adapted to be connected to said thermostat setting member for moving it to a manual operating position, a gear adapted to have a lost motion driving connection to said thermostat setting member, motor means connected to said gear for driving said thermostat setting member from said initial position to said operating position and from said operating position to said holding position, normally closed contact means for completing an energizing circuit for said motor means and opened in response to movement of said manually settable dial as permitted by said lost motion driving connection, timing mechanism including manually settable cooking hours means, means operated by setting of said cooking hours means for closing said circuit to energize said motor means to drive said thermostat setting member from said initial position to said operating position, means operated by said cooking hours means at a time determined by the cooking period for which said cooking hours means is set for closing a circuit to energize said motor means to drive said thermostat setting member from said operating position to said holding position, limit switch contact segment means stationarily mounted adjacent said gear, and contact means carried by said gear for engaging said limit switch contact segment means to complete the energizing circuit for said motor means to drive said thermostat setting member from said initial position to said operating position and for opening the same in response to movement of said thermostat setting member to said operating position and for completing the energizing circuit for said motor means to drive said thermostat setting member from its operating position to said holding position and for opening the same in response to movement of said thermostat setting member to said holding position.

10. The invention, as set forth in claim 9, wherein the lost motion driving connection comprises a plate adapted to be non-rotatably mounted on the thermostat setting member and fitting loosely within a cavity in the gear, and a detent on said plate operates the contact means to open position on rotation of said thermostat setting member by the manually settable dial to a position such that said gear is driven by said plate engaging one side of said cavity.

11. The invention, as set forth in claim 10, wherein the contact means includes an overcenter member that is operated by the detent to overcenter contact open position.

12. The invention, as set forth in claim 11, wherein means cooperate with the overcenter member to operate it to overcenter contact closed position on rotation of the thermostat setting member to the initial position.

References Cited by the Examiner

UNITED STATES PATENTS

| | | |
|---|---|---|
| 2,216,597 | 10/1940 | Minneci. |
| 2,392,166 | 1/1946 | Lockwood. |
| 2,529,913 | 11/1950 | Candor _____________ 307—141 |
| 2,801,799 | 8/1957 | McColloch ___________ 236—46 |
| 3,043,517 | 7/1962 | Hanna _______________ 236—46 |

ALDEN D. STEWART, *Primary Examiner.*